(12) United States Patent
Lin

(10) Patent No.: US 6,777,008 B2
(45) Date of Patent: Aug. 17, 2004

(54) NONTOXIC EDIBLE BUBBLE BLOWING LIQUID COMPOSITION

(76) Inventor: Mon-Sheng Lin, 5th Floor, No. 4, Lane 7, Pao Kao Road, Hsintien, Taipei Hsien (TW)

( * ) Notice: Subject to any disclaimer, the term of this patent is extended or adjusted under 35 U.S.C. 154(b) by 13 days.

(21) Appl. No.: 10/327,935

(22) Filed: Dec. 26, 2002

(65) Prior Publication Data

US 2004/0126465 A1 Jul. 1, 2004

(51) Int. Cl.$^7$ ............................ A23G 3/00; B01F 17/00
(52) U.S. Cl. .......................................... 426/104; 516/19
(58) Field of Search ........................... 426/104; 516/14, 516/19

(56) References Cited

U.S. PATENT DOCUMENTS

| | | | | | |
|---|---|---|---|---|---|
| 519,923 | A | * | 5/1894 | McNaughton | ................ 516/19 |
| 2,433,625 | A | * | 12/1947 | Raspet | ......................... 516/14 |
| 2,469,045 | A | * | 5/1949 | La Vietes | .................... 516/14 |
| 4,192,767 | A | * | 3/1980 | Flournoy et al. | |
| 4,511,497 | A | * | 4/1985 | Ehrlich | ........................ 516/14 |
| 6,008,172 | A | * | 12/1999 | Broshi | |
| 6,056,983 | A | * | 5/2000 | Broshi | ......................... 426/104 |
| 6,303,164 | B2 | * | 10/2001 | Cottone et al. | ............. 426/104 |
| 6,384,089 | B1 | * | 5/2002 | Tomida | |
| 6,482,425 | B1 | * | 11/2002 | Huet et al. | |
| 6,593,375 | B2 | * | 7/2003 | Ammon, Jr. | ................. 516/14 |

FOREIGN PATENT DOCUMENTS

| | | | | |
|---|---|---|---|---|
| JP | 51-38290 | * | 3/1976 | |
| WO | WO97/26076 | * | 7/1997 | ................. 426/104 |
| WO | WO98/54276 | * | 12/1998 | ................. 426/104 |

OTHER PUBLICATIONS

CRC, Handbook of Food Additives, Furia pp. 142–144, 416, 1971.*

* cited by examiner

Primary Examiner—Steven L. Weinstein
(74) Attorney, Agent, or Firm—Troxell Law Office PLLC

(57) ABSTRACT

The present invention relates to the ingredients for nontoxic bubble liquid that mainly contains pure water, blowing agent, thickener, sweetener, seasoning and enhancer. Besides blowing bubbles with the stick soaked with the edible bubble liquid, users can also blow bubbles from their mouth. Such unique bubble liquid not only draws people's attention, but eliminates harm to human bodies. Moreover, the sweetness and fragrance of the bubble liquid makes it more tasty.

11 Claims, No Drawings

NONTOXIC EDIBLE BUBBLE BLOWING LIQUID COMPOSITION

FIELD OF THE INVENTION

The present invention relates to ingredients for nontoxic bubble liquid, especially the ingredients that are edible, sweet and that produce edible and touchable bubbles during play, making bubble blowing more entertaining.

BACKGROUND OF THE INVENTION

Traditionally, the ingredient of bubble suds is inedible solvent that limits the players to blow bubbles with the stick soaked with suds. In addition to inedibility, anyone touching such suds must clean his/her hand in case the chemical ingredient enters into the human body.

SUMMARY OF THE INVENTION

The main objective for the present invention is to add edible ingredients into the bubble liquid that makes it not only able to produce bubbles, but also allow people to swallow the bubbles or place the bubble liquid into their mouth to blow bubbles without worrying about any damage caused by the liquid to their body. Furthermore, the sweetness and fragrance in the bubbles make the liquid more tasty.

The following describes the detailed ingredients and operation action for the present invention.

DETAILED DESCRIPTION OF THE INVENTION

The nontoxic bubble liquid for the present invention contains:
a. pure water;
b. blowing agent, in this case sodium abietate is used;
c. thickener, in this case sodium carboxy methyl cellulose is used;
d. sweetener, in this case syrup is used;
e. flavor and potentiator: 0.1–0.5 g per 100 grams of pure water.

One allotment for every 100 grams of water contains:
1. 0.1~0.5 gram of thickener (sodium carboxy methyl cellulose) that increases the thickness of the pure water;
2. 0.1~1 gram of blowing agent (sodium abietate) that produces different sizes of bubbles with stable shapes;
3. 1~1.5 grams of edible sweetener (syrup);
4. 1~1.5 grams of flavor and potentiator that make the bubble liquid more tasty;
5. 0.1~0.3 gram of preservative (sodium benzoate) that suppresses the growth of bacteria, preventing the bubble liquid from rotting in a short time and keeping sodium carboxy methyl cellulose staying stable under a certain temperature and within the expiration date;
6. spice is allowable to enhance the taste.

Another allotment for every 100 grams of pure water of the bubble liquid contains:
1. 0.1~0.5 gram of thickener (sodium carboxy methyl cellulose) that increases the thickness of the pure water;
2. 0.1~1 gram of blowing agent (sodium abietate) that produces different sizes of bubbles with stable shapes;
3. 1~1.5 grams of edible sweetener (syrup);
4. 1~1.5 grams of seasoning and enhancer;
5. 0.1~0.3 gram of preservative (sodium benzoate) that suppresses the growth of bacteria, preventing the bubble liquid from rotting in a short time and keeping sodium carboxy methyl cellulose staying stable under a certain temperature and within the expiration date;
6. spice is allowable to enhance the taste:

Still another allotment for every 100 grams of pure water of the bubble liquid contains:
1. 0.1~0.5 gram of thickener (sodium carboxy methyl cellulose) that increases the thickness of the pure water;
2. 0.1~1 gram of blowing agent (sodium abietate) that produces bubbles of different sizes and with stable shapes;
3. 1~1.5 grams of edible sweetener (syrup);
4. 1~1.5 grams of flavor and potentiator that make the bubble liquid more tasty;
5. 0.1~0.3 gram of bacteriostat (calcium undeclylenate) that suppresses the growth of bacteria, avoiding the generation of harmful materials, preventing the bubble liquid from rotting in a short time and keeping sodium carboxy methyl cellulose staying stable under a certain temperature and within the expiration date;
6. spice is allowable to enhance the taste.

What is claimed is:

1. A nontoxic edible bubble blowing liquid composition, containing:
   a. pure water;
   b. sodium abietate as a blowing agent;
   c. sodium carboxy methyl cellulose as a thickener;
   d. syrup as a sweetener; and
   e. flavor.
2. The composition of claim 1, wherein said flavor contains enhancer.
3. The composition of claim 1, wherein said flavor contains seasoning.
4. The composition of claim 1, further comprising sodium benzoate as a preservative.
5. The composition of claim 1, wherein the flavor contains spice.
6. The composition of claim 1, wherein the composition contains 0.7–1 gram of sodium abietate per 100 grams of pure water.
7. The composition of claim 1, wherein the composition contains 0.3–0.5 gram of sodium carboxy methyl cellulose per 100 grams of pure water.
8. The composition of claim 1, wherein the composition contains 1–1.5 gram of sweetener per 100 grams of pure water.
9. The composition of claim 1, wherein the composition contains 0.1–0.5 gram of sodium carboxy methyl cellulose; 0.1–1 gram of sodium abietate; 1–1.5 gram of syrup; 1–1.5 gram of flavor and enhancer, and further containing 0.1–0.3 gram of sodium benzoate as a preservative that suppresses bacteria growth; and spice that improves taste; all per 100 grams of pure water.
10. The composition of claim 1, wherein the composition contains 0.1–0.5 gram of sodium carboxy methyl cellulose; 0.1–1 gram of sodium abietate that produces different sizes of bubbles with stable shapes; 1–1.5 grams of syrup; 1–1.5 grams of flavor, 0.1–0.3 grams of calcium undeclylenate as a bacteriostat; and spice; all per 100 grams of pure water.
11. The composition of claim 1, further comprising calcium undeclylenate as a bacteriostat.

* * * * *